Patented Aug. 13, 1940

2,210,877

UNITED STATES PATENT OFFICE 2,210,877

SULPHURIZING CHEMICAL COMPOUNDS

Ulric B. Bray, Palos Verdes Estates, Calif., assignor to Union Oil Company of California, Los Angeles, Calif., a corporation of California No Drawing. Application January 12, 1937, Serial No. 120,244

8 Claims. (Cl. 260—139)

This invention relates to a method for the sulphurization of oils, esters and various other chemical compounds, and the object of the invention is to provide a process which will keep the sulphurizing reaction from proceeding too rapidly or too far, will be adapted to efficient control, and will yield well defined chemical products relatively free from coke and other insoluble materials.

The invention resides primarily in supplying sulphur to the reacting mass of any of the above indicated or other desired sulphurizable chemicals only as fast as the sulphur is used up beyond the certain concentration required for directing the reaction. In other words, the sulphur required for the reaction is added from time to time in small increments, the addition being controlled so that the sulphur does not exceed concentrations beyond those necessary for a controlled reaction, whereby excessive formation of sulphurized bodies and coke-like or other insoluble polymers or similar materials which would otherwise result, will be avoided.

In practicing the invention the sulphurization will ordinarily be accomplished in conjunction with the application of heat according to well known procedures applied to the respective materials to be sulphurized. A quantity of sulphur will be added to the mass to be reacted upon in only a relatively small proportion beyond that quantity necessary for directing the reaction. Such small proportion will be such that it will be used up readily without opportunity for the type of reaction to pass out of control. As a result only the desired sulphurization will take place and incident objectionable formation products of insoluble nature or coke-like form will be avoided. By frequent additions of further small quantities of sulphur added only as the reacting mass properly takes them up, only that sulphur will be present at any given time which is necessary to the requirements of the reaction, at least up to the point of saturation.

I have found that this procedure of introducing the sulphur in small increments in step with the requirement of the reaction produces efficient and satisfactory sulphurization very readily, a result which has not been heretofore attained by temperature control or other controls which have been undertaken. In other words, while temperature control is important, an additional control of great effectiveness is found in the regulated addition of sulphur by relatively small and frequent increments.

In the case of mixtures wherein the sulphur is soluble to only a limited extent, it is preferred that a melted sulphur phase be not present because of excessive reaction at the surface which tends to produce the objectionable coke-like or other insoluble materials above mentioned. By adding the sulphur at a rate only sufficient to satisfy the solvent power of the reaction mass for the sulphur, the needs of the reaction are best met and no opportunity is afforded for the reaction to go out of control or to progress too rapidly thereby to produce objectionable materials such as sulphurized polymers.

By employing this means of controlling the sulphurization, I have found a distinct improvement over results obtainable heretofore by simply heating all of the required sulphur along with the chemical to be sulphurized. For example, I have found the present process to be highly satisfactory in the sulphurization of dibutylphthalate. Also, petroleum oils and various fractions of petroleum oils, particularly the olefinic or unsaturated petroleum fractions, are readily sulphurized to produce desired compounds without pronounced tendency toward the formation of bodies of excessive molecular weight either through the influences of substitution or polymerization or otherwise. In addition to unsaturated materials, saturated materials may be sulphurized in similar fashion without danger of heaving the reaction extend too far and produce heavy undesirable products. The process may be applied not only to petroleum oil fractions but also to vegetable and animal oils. Such sulphurized compounds are frequently desired in connection with the production of various types of lubricants, extreme pressure gear oils, cutting oils, emulsifiable oils, so-called soluble oils and kindred materials. So far as concerns sulphur-bearing chemicals in general, the application of the process producing such sulphurized compounds will have wide application.

In addition to aiding sulphurization by the addition of the required sulphur only in small increments at spaced intervals, the sulphurization may also be controlled by conducting the same under pressure at suitable temperatures. If necessary pressure relief valves may be employed to prevent the escape of hydrogen sulphide in those instances where it is formed. By operating under pressure, the most suitable temperature conducive to the desired results may be employed, and volatilizable materials are maintained in liquid or unvaporized condition. For example, in some instances a temperature of 350° F. to 550° F. is most satisfactory for purposes of sulphurization, whereas such temperatures present difficulties at normal pressures with materials of a volatile nature. For that reason pressures of suitable degree, for example 10 to 750 pounds may be employed. As a specific example, gasoline or similar petroleum fractions either a cracked or a straight run distillate, may be easily sulphurized under pressure at temperatures above 400° F., for example 550° F. By operating at these temperatures under suitable pressure, for example 400 pounds in a pressure vessel or coil, cracking or incipient cracking of the gasoline to produce olefinic or unsaturated materials may be produced coincident with sulphurization thereof. Spray oils and lubricating oils may be similarly cracked and sulphurized. Similarly, sulphurization of unsaturated fractions from gasoline, kerosene or other petroleum fractions already containing olefinic fractions, or similar fractions which have been segregated or concentrated and consist largely of olefinics and unsaturates may be conveniently sulphurized under pressure. In sulphurizing such unsaturates, the sulphur primarily tends to enter at the unsaturated linkages or double bonds, and the process may be and preferably is controlled so that a minimum splitting off of hydrogen and consequent formation of hydrogen sulphide takes place. In applying pressures for sulphurization purposes wherein coincident cracking takes place or wherein coincident cracking is avoided, such pressures may be used not only where the sulphur is added in a plurality of excessive increments to obtain the results described but also where the sulphur is added substantially at one time according to the more usual method of sulphurization procedures.

It is to be understood that the above disclosures are furnished as being illustrative of the generic invention. They are not to be taken as limiting beyond the scope of the appended claims inasmuch as it is obvious that the process may be modified and expanded both as to its details and its application in many ways apparent to those skilled in the art.

I claim:

1. A process for sulphurizing petroleum fractions which comprises heating saturated petroleum fractions in the liquid phase in the presence of free sulphur under pressures between about 10 pounds and about 750 pounds per square inch and at temperatures between about 350° F. and about 550° F. whereby unsaturation of said fractions is effected and coincidentally sulphur enters at the points of such unsaturation, the sulphur being supplied to the reaction only in small successive increments substantially only sufficient to satisfy the unsaturation as it is produced and as the sulphur is required, whereby substantially no excess of sulphur over immediate sulphur requirements is present at any given stage of the reaction.

2. A process according to claim 1 wherein substantially no molten sulphur is present at any stage.

3. A process for sulphurizing petroleum fractions which comprises heating gasoline and kindred fractions at temperatures between about 400° F. and about 550° F. and at pressures approximating 400 pounds per square inch in the presence of free sulphur, the sulphur being added to the petroleum fraction only in a succession of small increments sufficient approximately only to satisfy the requirements for sulphur at any given stage and without the presence of excess sulphur at any stage of the reaction.

4. A method for sulphurizing chemical compounds comprising heating a saturated sulphurizable chemical compound in the liquid phase in the presence of free sulphur under pressure and temperature conditions effecting unsaturation of the compound and coincidentally causing sulphur to enter the molecules of the compound at the points of such unsaturation, the free sulphur being supplied to the reaction only in small successive increments, each increment being substantially only sufficient to satisfy the unsaturation as it is produced and as the sulphur is required whereby substantially no excess of sulphur over immediate sulphur requirements is present at any given stage of the reaction.

5. A method according to claim 4 wherein the chemical compound treated is a mineral oil fraction.

6. A method according to claim 4 wherein the temperatures lie between about 350° F. and about 550° F.

7. A method according to claim 4 wherein the compound treated is selected from the group consisting of sulphurizable esters and ester oils.

8. A method according to claim 4 wherein the compound is dibutyl phthalate.

ULRIC B. BRAY.